G. JOHNSTON.
FILTERING APPARATUS.
APPLICATION FILED AUG. 4, 1910.
988,107.
Patented Mar. 28, 1911.
2 SHEETS—SHEET 1.
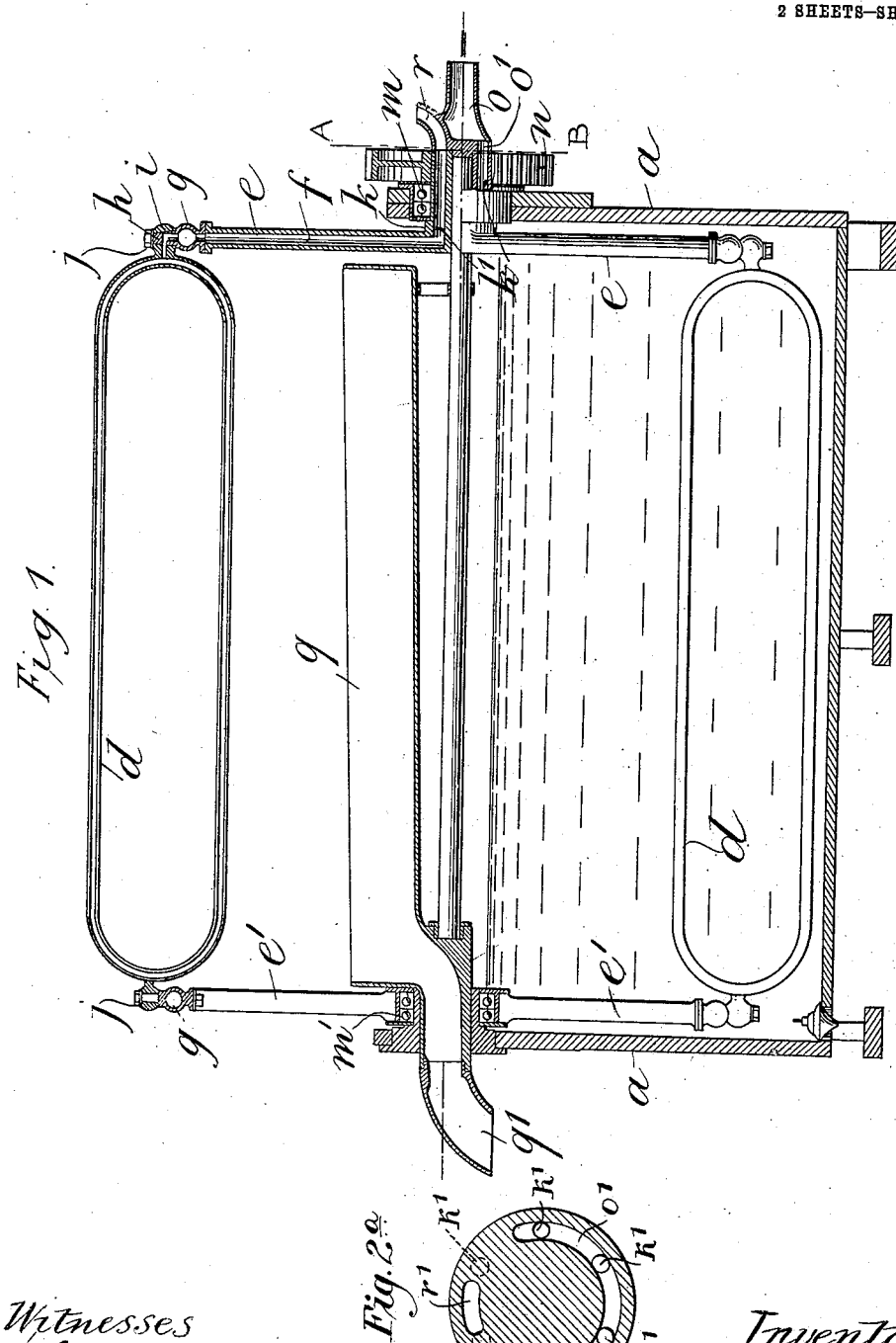
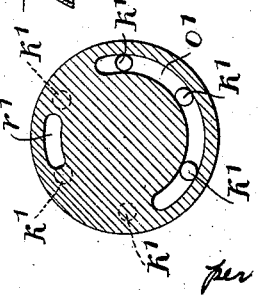
Witnesses
Inventor G. JOHNSTON.
FILTERING APPARATUS.
APPLICATION FILED AUG. 4, 1910.
988,107.
Patented Mar. 28, 1911.
2 SHEETS—SHEET 2.
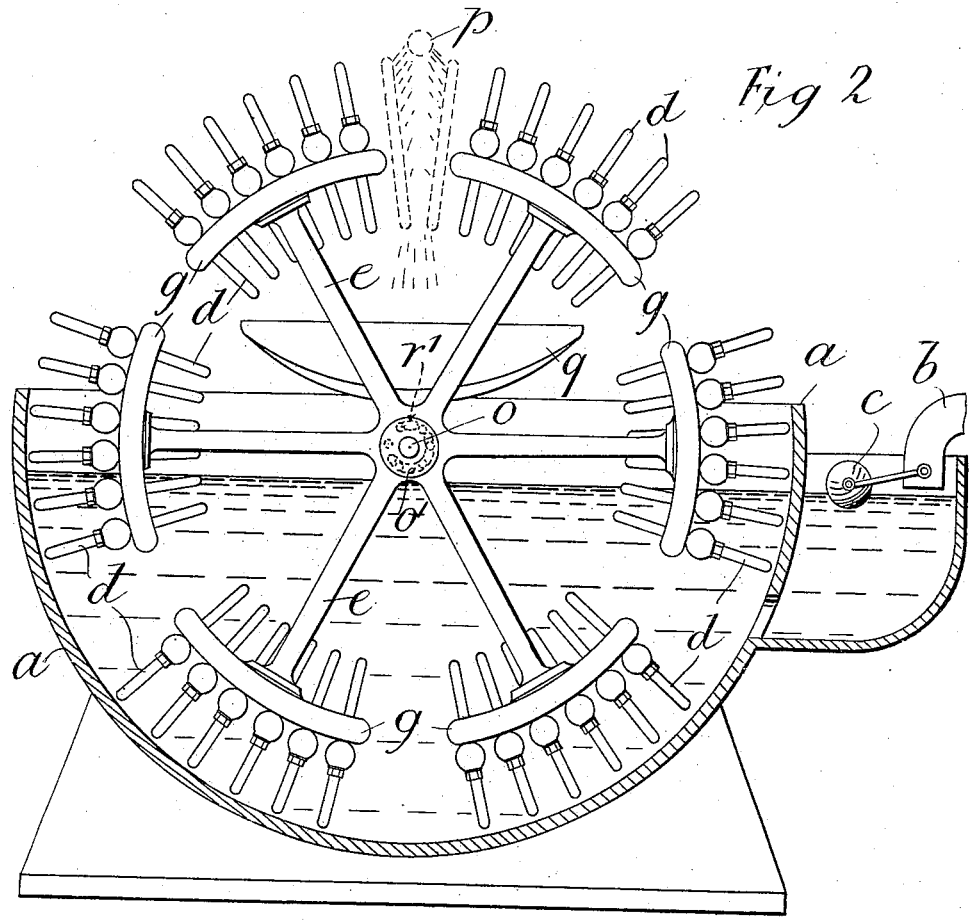
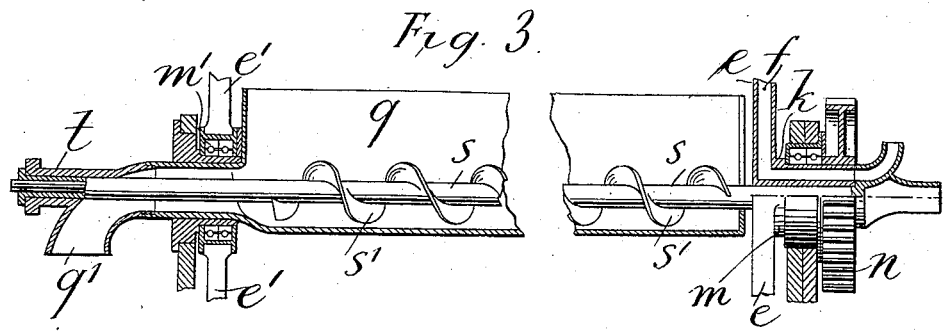

UNITED STATES PATENT OFFICE.

GEORGE JOHNSTON, OF CHIHUAHUA, MEXICO.

FILTERING APPARATUS.

988,107.        Specification of Letters Patent.        Patented Mar. 28, 1911.

Application filed August 4, 1910. Serial No. 575,585.

*To all whom it may concern:*

Be it known that I, GEORGE JOHNSTON, a subject of the King of Great Britain and Ireland, residing at Chihuahua, Mexico, have invented Improvements in or Relating to Filtering Apparatus, of which the following is a specification.

This invention relates to filtering apparatus of the kind wherein filtering frames are moved into and out of the liquid under treatment and while immersed subject to the action of an air pump or exhauster so that liquid strained by the filtering frames is drawn off while solid matter is held against the frames.

The object of the present invention is to provide an improved construction of filtering apparatus of the character referred to whereby the quantity of liquid that can be filtered in a given time is very considerably increased over that possible with arrangements as hitherto constituted. For this purpose the filtering frames arranged singly or in groups are adapted to be moved about a horizontal axis in such a manner that the frames enter the liquid while more or less horizontal in position and thereafter traverse the liquid until at the time of leaving the liquid they again occupy a more or less horizontal position but with the reverse side uppermost. While any frame or group of frames is immersed in the liquid it is automatically placed in communication with an air pump or the like, but immediately it leaves the liquid such communication is automatically interrupted and the frames afterward cleaned of the impurities attached to their outer surfaces prior to again entering the liquid, the said cleaning being effected for example by means of a liquid applied exteriorly to the frames, by means of fluid under pressure such as air supplied internally to the frames in a manner *per se* known or by both of these means in combination as may be found most convenient in practice.

Apparatus embodying the improvements can be variously constructed.

In the accompanying drawings, Figures 1 and 2 are sectional elevations at right angles to one another, of one constructional arrangement; Fig. 2ª is a section on the line A—B of Fig. 1, and Fig. 3 is a sectional elevation of a modification.

As shown in Figs. 1 and 2, the liquid to be treated, such as tailing slimes obtained in gold recovery processes, is supplied to an approximately semicylindrical vat $a$ by a pipe $b$ controlled by a ball cock $c$ so that the level of the liquid in the vat remains substantially constant. The filtering frames $d$ which may, as ordinarily, be tubular, perforated, covered with filtering cloth and packed with filtering material, are connected in sets of six to hexagonally armed structures or carriers $e$, $e^1$ the arms of one of which viz. $e$ are hollow, as shown at $f$, and communicate at their outer extremities each with a header $g$ having a series of ported plugs $h$ that can be inserted in correspondingly ported sockets $i$ upon the filtering frames $d$ which latter can, for easy removal, be secured thereto by nuts $j$. The other carrier $e^1$ is similar to the carrier $e$ and the mode of securing the frames $d$ thereto the same, the only material difference being that the ports referred to are not provided.

The carrier $e$ is provided with a trunnion $k$ having ports $k^1$ communicating with the hollow arms $f$ and is supported by a ball bearing $m$ while a toothed wheel $n$ serves as one element of any suitable driving gear for the apparatus.

$o$ is a stationary duct connected to a pump and having a segmental port $o^1$ shaped as shown in Fig. 2ª and indicated by dot and dash lines in Fig. 2 so that each set of frames $d$ after immersion, is in communication with the pump until it leaves the liquid again.

$p$ is a perforated pipe arranged above the apparatus and by means of which liquid, such as water, or a weak cyanid solution for the particular application instanced, may be directed upon the frames $d$ while they pass, the said pipe being preferably arranged so that the planes of the frames are substantially vertical while subject to the action of the cleaning liquid.

$q$ is a trough or tray arranged between the carriers $e$, $e^1$ and beneath the pipe $p$ to receive the cleaning liquid from the latter and the impurities washed off the filtering frames, the outlet for the trough or tray $q$ being constituted by a duct $q^1$ which extends through the side of the vat $a$ carrying the ball bearing $m^1$ for the carrier $e^1$.

When fluid such as compressed air is to be supplied to the interior of the filtering frames $d$ for cleaning the said frames, or to assist in the said cleaning, the duct $o$ may be formed with a subsidiary duct $r$ having a port $r^1$ shaped as shown in Fig. 2ª indicated in dot and dash lines in Fig. 2, so that the ports $k^1$ in the trunnion $k$ may register therewith while the filtering frames $d$ are not immersed in the liquid in the vat and so receive a supply of fluid under pressure.

When the solid matter is removed from the filtering frames by compressed air without the aid of washing liquid, the trough or tray $q$ into which the detached matter falls may, as shown in Fig. 3, be made with a central pocket provided with a shaft $s$ having a screw conveyer blade $s^1$ which, rotating with the trunnion $k$, will serve to remove the solid matter from the trough or tray $q$ and discharge it through the outlet $q^1$. The latter is or may be provided with a bearing $t$ for the adjacent end of the shaft $s$.

In operation, the carriers $e$, $e^1$ in rotating cause the filter frames $d$ to enter the liquid in the vat $a$ and pass slowly therethrough until they emerge at the opposite side, during which time the ports $k^1$ corresponding to the sets of immersed frames are in communication through the port $o^1$ with the suction pump (not shown). After each group of frames $d$ has emerged from the vat the port $k^1$ pertaining thereto may be placed in communication through the port $r^1$ with a source of fluid under pressure serving to force from the filter frames the sediment that has accumulated thereon.

The details of construction can be variously modified.

What I claim is:—

1. In filtering apparatus of the kind described, a series of pairs of segmentally shaped headers, a series of plugs projecting from the convex surface thereof, a series of filtering frames having curved ends associated with each pair of headers, and sockets connecting the curved ends of the several filtering frames to the plugs of the headers.

2. Filtering apparatus of the kind described, comprising, in combination, a series of pairs of segmentally shaped headers, a series of filtering frames having curved ends associated with each pair of headers and disposed radially between them, a revoluble carrier having hollow arms corresponding in number to the number of pairs of headers and each connected to one header of a pair, a series of ported plugs in each such connected header, corresponding in number to the number of filtering frames to be carried, a series of ported sockets connecting the frames at one end to the said headers, a second revoluble carrier for the remaining headers, solid plugs carried thereby, and sockets on the frames at the ends opposite to the ends connected to the said hollow armed carrier for securing the frames to the second carrier, a trunnion on the hollow armed carrier having ports arranged parallel to its axis and in communication with the hollow arms, and a stationary suction duct having a segmental port arranged to register with a number of the ports in the trunnion at a time.

3. Filtering apparatus of the kind described, comprising, in combination, a series of pairs of segmentally shaped headers, a series of filtering frames having curved ends associated with each pair of headers and disposed radially between them, a revoluble carrier having hollow arms corresponding in number to the number of pairs of headers and each connected to one header of a pair, a series of ported plugs in each such connected header, corresponding in number to the number of filtering frames to be carried, a series of ported sockets connecting the frames at one end to the said headers, a second revoluble carrier for the remaining headers, solid plugs carried thereby, and sockets on the frames at the ends opposite to the ends connected to the said hollow armed carrier for securing the frames to the second carrier, a trunnion on the hollow armed carrier having ports arranged parallel to its axis and in communication with the hollow arms, and a stationary duct having a segmental suction port arranged to register with a number of the ports in the trunnion at a time and a segmental pressure port arranged to register at that time with another of said trunnion ports.

Signed at New York this 26th day of July 1910.

GEORGE JOHNSTON.

Witnesses:
 JAS. D. McLAURIN,
 ARCH. McLAURIN.

---

Copies of this patent may be obtained for five cents each, by addressing the "Commissioner of Patents, Washington, D. C."